United States Patent
Matsumoto et al.

(10) Patent No.: US 9,318,745 B2
(45) Date of Patent: Apr. 19, 2016

(54) CONDUCTIVE AGENT FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

(75) Inventors: Hiroyuki Matsumoto, Frisco, TX (US); Takeshi Ogasawara, Kobe (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 411 days.

(21) Appl. No.: 13/885,486

(22) PCT Filed: Nov. 28, 2011

(86) PCT No.: PCT/JP2011/077339
§ 371 (c)(1),
(2), (4) Date: May 15, 2013

(87) PCT Pub. No.: WO2012/073874
PCT Pub. Date: Jun. 7, 2012

(65) Prior Publication Data
US 2013/0236789 A1   Sep. 12, 2013

(30) Foreign Application Priority Data
Nov. 30, 2010   (JP) ................. 2010-266086

(51) Int. Cl.
*H01M 4/62*   (2006.01)
*H01M 4/131*   (2010.01)
(Continued)

(52) U.S. Cl.
CPC .............. *H01M 4/625* (2013.01); *H01M 4/626* (2013.01); *H01M 4/131* (2013.01); *H01M 10/052* (2013.01); *H01M 10/4235* (2013.01); *H01M 2004/028* (2013.01)

(58) Field of Classification Search
None
See application file for complete search history.

(56) References Cited

U.S. PATENT DOCUMENTS 6,284,409 B1 *   9/2001   Higashiyama ........ H01M 4/242
                                              420/900
7,108,944 B2    9/2006   Kweon et al.
(Continued)

FOREIGN PATENT DOCUMENTS

CN   1399363 A   2/2003
CN   101339984 A   1/2009
(Continued)

OTHER PUBLICATIONS

Office Action Chinese Patent Application No. 201180057760.0 dated Jan. 26, 2015.
(Continued)

*Primary Examiner* — Alix Eggerding
(74) *Attorney, Agent, or Firm* — McDermott Will & Emery LLP

(57) ABSTRACT

To provide a conductive agent for a nonaqueous electrolyte secondary battery and the like, in which oxidative decomposition reaction of an electrolyte is sufficiently suppressed during charging and discharging under high-temperature, high-voltage conditions and thus the cycle characteristics under these conditions are improved.

A conductive agent main body composed of carbon and a compound attached to a surface of the conductive agent main body are contained. The average particle size of primary particles or secondary particles of the conductive agent main body is larger than the average particle size of the compound and the compound contains at least one metal element selected from the group consisting of aluminum, zirconium, magnesium, and a rare earth element.

18 Claims, 2 Drawing Sheets

(51) Int. Cl.
*H01M 10/052* (2010.01)
*H01M 4/02* (2006.01)
*H01M 10/42* (2006.01)

(56) References Cited

U.S. PATENT DOCUMENTS

| | | |
|---|---|---|
| 7,138,209 B2 | 11/2006 | Kweon et al. |
| 7,811,478 B2 | 10/2010 | Yoshida et al. |
| 8,007,941 B2 | 8/2011 | Kweon et al. |
| 8,034,486 B2 | 10/2011 | Kweon et al. |
| 8,815,446 B2 | 8/2014 | Wakita et al. |
| 2002/0172869 A1* | 11/2002 | Kudo .............. H01G 9/155 429/232 |
| 2003/0054250 A1* | 3/2003 | Kweon ............ H01M 4/131 429/231.1 |
| 2005/0208380 A1 | 9/2005 | Park et al. |
| 2009/0104517 A1* | 4/2009 | Yuasa .............. H01M 4/505 429/158 |
| 2012/0288761 A1 | 11/2012 | Park et al. |

FOREIGN PATENT DOCUMENTS

| | | |
|---|---|---|
| CN | 101401233 A | 4/2009 |
| CN | 101567447 A | 10/2009 |
| JP | 2002-050358 A | 2/2002 |
| JP | 2003-173770 A | 6/2003 |
| JP | 2007-522619 A | 8/2007 |
| JP | 2009-218217 A | 9/2009 |

OTHER PUBLICATIONS

International Search Report issued in International Application No. PCT/JP2011/077339 mailed Jan. 10, 2012.
Office Action Chinese Patent Application No. 201180057760.0 dated Sep. 11, 2015.

* cited by examiner

CONDUCTIVE AGENT FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

TECHNICAL FIELD

The present invention relates to a conductive agent for use in nonaqueous electrolyte secondary batteries, and a positive electrode and a battery that use the conductive agent.

BACKGROUND ART

In recent years, portable information terminals such as cellular phones, laptop computers, and PDAs, portable music players, and portable game consoles have become increasingly smaller and more light-weight and electric vehicles with secondary batteries onboard have become widespread in full scale. With such trends, nonaqueous electrolyte secondary batteries used as driving power sources are also required to achieve ever higher capacity and longer lifetime. One way to achieve a high capacity is to increase the end-of-charge voltage compared to conventional art. However, increasing the end-of-charge voltage causes the positive electrode and the electrolyte in a charged state to react with each other, resulting in oxidative decomposition of the electrolyte. In order to increase the capacity and extend the lifetime of a nonaqueous electrolyte secondary battery by suppressing the oxidative decomposition reaction, the following proposals (1) to (3) were made.

(1) A positive electrode active material is proposed in which a core containing at least one lithium compound and a surface-treated layer formed on the core contain a coating material such as a hydroxide or the like of Mg (refer to PTL 1 below).

(2) An electrode additive is proposed in which a surface of a core particle composed of magnesium hydroxide or the like is coated with a conductive material (refer to PTL 2 below).

(3) A conductive agent constituted by fine particles coated with ITO obtained by doping tin oxide is proposed (refer to PTL 3 below).

CITATION LIST

Patent Literature

PTL 1: Japanese Published Unexamined Patent Application No. 2009-218217
PTL 2: Japanese Published Unexamined Patent Application (Translation of PCT Application) No. 2007-522619
PTL 3: Japanese Published Unexamined Patent Application No. 2002-50358

SUMMARY OF INVENTION

Technical Problem

However, the techniques (1) to (3) cannot sufficiently suppress the oxidative decomposition reaction of the electrolyte and face challenges regarding the cycle characteristics under high temperature, high voltage conditions.

Solution to Problem

The present invention is characterized in including a conductive agent main body composed of carbon and a compound attached to a surface of the conductive agent main body, in which the average particle size of primary particles or secondary particles of the conductive agent main body is larger than the average particle size of the compound and the compound contains at least one metal element selected from the group consisting of aluminum, zirconium, magnesium, and a rare earth element.

Advantageous Effects of Invention

The present invention exhibits advantageous effects of dramatically improving the cycle characteristics.

DESCRIPTION OF EMBODIMENTS

Figure 1:
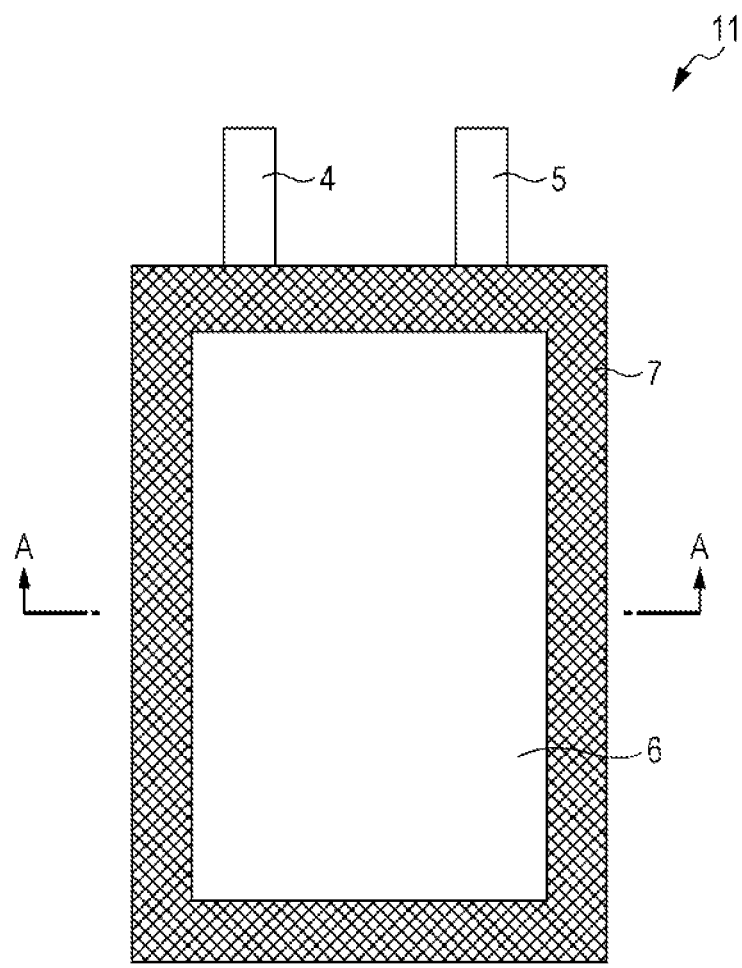
FIG. 1 is a front view of a battery according to an embodiment of the present invention.

The present invention is characterized in including a conductive agent main body composed of carbon and a compound attached to a surface of the conductive agent main body. The average particle size of primary particles or secondary particles of the conductive agent main body is larger than the average particle size of the compound. The compound contains at least one metal element selected from the group consisting of aluminum, zirconium, magnesium, and a rare earth element.

The technique of suppressing the oxidative decomposition reaction of the electrolyte by coating the surface of the positive electrode active material with a metal compound or the like has been available. However, merely suppressing the oxidative decomposition reaction of the electrolyte at the surface of the positive electrode active material cannot sufficiently improve the cycle characteristics at high temperature and high voltage. This is because the positive electrode active material of a nonaqueous secondary battery mainly contains a transition metal such as cobalt or nickel which serves as a catalyst, and the oxidative decomposition of the electrolyte also occurs at the surface of the conductive agent attached to the positive electrode active material.

The contact area between the electrolyte and the conductive agent main body is decreased by attaching a compound containing a metal element such as a rare earth element to the surface of the conductive agent main body as described above. Thus, the catalytic property of the conductive agent main body, which is induced by adhesion to the positive electrode active material, is lowered and the oxidative decomposition reaction of the electrolyte at the surface of the conductive agent main body is suppressed. As a result, the problem of a decrease in electrical conductivity in the electrode caused by electrolyte decomposition products covering the surface of the conductive agent is suppressed. Therefore, the cycle characteristics at high temperature and high voltage are dramatically improved.

The limitation that the average particle size of primary particles or secondary particles of the conductive agent main body is larger than the average particle size of the compound is set to clarify that it is the compound that is attached to the surface of the conductive agent main body (not the conductive agent main body attached to the surface of the compound). This limitation is set due to the following reason. That is, when the average particle size of primary particles or secondary particles of the conductive agent main body is smaller than the average particle size of the compound, the conductive agent main body is attached to the surface of the compound. Thus, the area of the conductive agent main body that remains uncoated cannot be sufficiently reduced and the oxidative decomposition reaction of the electrolyte cannot be sufficiently suppressed. In such a case, there is no conductive agent between the particles of the positive electrode active material, resulting in a state in which only a compound not having electrical conductivity is present between the particles of the positive electrode active material or a state in which the particles of the conductive agent are not in contact with each other. Accordingly, the conductive network formed by the conductive agent is blocked in the positive electrode and the resistance in the positive electrode is increased. In view of this, the average particle size of the compound is more preferably limited to 10% or less of the average particle size of the primary particles or secondary particles of the conductive agent main body.

The average particle size of primary particles or secondary particles of the conductive agent main body is considered here since the conductive agent main body composed of carbon may take a form of primary particles in some cases and secondary particles in other cases. In particular, when the conductive agent main body takes a form of primary particles, the average particle size of primary particles is considered. When the conductive agent main body takes a form of secondary particles, the average particle size of secondary particles is considered. Examples of the conductive agent main body that takes a form of primary particles include VGCF and carbon nanotube. Examples of the conductive agent main body that takes a form of secondary particles include carbon black such as acetylene black and Ketjen black.

The compound preferably contains at least one selected from the group consisting of a hydroxide of the metal element described above, an oxyhydroxide of the metal element described above, a carbonate compound of the metal element described above, and an oxide of the metal element described above.

The compound is preferably at least one compound selected from the group consisting of a hydroxide of the rare earth element described above, an oxyhydroxide of the rare earth element described above, a carbonate compound of the rare earth element described above, and an oxide of the rare earth element described above. In particular, the compound is preferably a hydroxide of the rare earth element described above or an oxyhydroxide of the rare earth element described above.

Compared to hydroxides of aluminum, zirconium, and magnesium, a hydroxide of a rare earth element decreases the contact area between the electrolyte and the conductive agent and reduces the catalytic property of the conductive agent main body, thereby further suppressing decomposition of the electrolyte. In particular, hydroxides and oxyhydroxides of rare earth elements can further lower the catalytic property and thus decomposition of the electrolyte can be further suppressed.

The ratio of the compound to the conductive agent main body is preferably less than 383 mass % (more preferably 77 mass % or less and most preferably 14.9 mass % or less) in terms of the metal element in the compound.

This is because if the ratio of the compound to the conductive agent main body is excessively large, the surface of the conductive agent main body is excessively coated with the compound and the conductivity in the electrode is decreased.

The lower limit of the ratio of the compound to the conductive agent main body is preferably 0.8 mass % or more in terms of the metal element in the compound. If the ratio is less than 0.8 mass %, the amount of the compound on the surface of the conductive agent is excessively small and the effect of suppressing decomposition of the electrolyte is not sufficiently exhibited.

The conductive agent for a nonaqueous electrolyte secondary battery and a positive electrode active material are used.

The conductive agent is on the surface of the positive electrode active material. The conductive agent is constituted by a conductive agent main body composed of carbon and a compound attached to the surface of the conductive agent main body and is characterized in that the average particle size of primary particles or secondary particles of the conductive agent main body is larger than the average particle size of the compound and the compound contains at least one metal element selected from the group consisting of aluminum, zirconium, magnesium, and a rare earth element.

Due to these features, the oxidative decomposition reaction of the electrolyte can be suppressed while maintaining the electrical conductivity in the positive electrode.

The compound attached to the surface of the conductive agent main body preferably contains a rare earth element.

Compared to compounds that contain other elements, a compound that contains a rare earth element can further lower the catalytic property of the conductive agent main body and thus decomposition of the electrolyte can be further suppressed.

A compound that contains at least one metal element selected from the group consisting of aluminum, zirconium, magnesium, and a rare earth element is preferably attached to the surface of the positive electrode active material.

When the compound is present on the surface of the positive electrode active material also, the contact area between the positive electrode active material and the electrolyte is decreased and the oxidative decomposition reaction of the electrolyte in the battery can be further suppressed.

The compound attached to the surface of the positive electrode active material preferably contains a rare earth element.

When a rare earth element is contained, the contact area can be decreased and the catalytic property of the positive electrode active material can be lowered.

The positive electrode active material preferably contains at least one element selected from the group consisting of nickel, cobalt, and manganese. The positive electrode active material is particularly preferably lithium cobaltate or a lithium complex oxide that contains nickel, cobalt, and manganese.

A nonaqueous electrolyte secondary battery is characterized by including the positive electrode for a nonaqueous electrolyte secondary battery described above.

According to this battery, cycle characteristics at high temperature and high voltage can be improved.

(Other Features)

(1) The compound that contains a metal element such as a rare earth element preferably has an average particle size of 100 nm or less. A compound having an average particle size exceeding 100 nm is excessively large relative to the conductive agent main body and thus the conductive network formed by the conductive agent may be blocked and the resistance in the positive electrode may be increased.

The lower limit of the average particle size of the compound is preferably 0.1 nm or more. When the average particle size is less than 0.1 nm, the surface of the conductive agent main body will be excessively coated with the compound at a conductive agent main body/compound ratio (mass ratio) limited as above due to their excessively small size, and thus the electrical conductivity in the electrode plate will be decreased.

(2) An example of a method for attaching a compound containing a metal element such as a rare earth element to the surface of the conductive agent main body is a method that includes mixing a conductive agent main body with water to prepare an aqueous solution containing a dispersed conductive agent main body and adding thereto an aqueous solution prepared by dissolving an aluminum salt, a zirconium salt, a magnesium salt, or a rare earth salt. A nitrate, a sulfate, an acetate, and the like may be used as these salts. In adding the solution of the salt, the pH value of the aqueous solution containing the dispersed conductive agent main body is preferably limited to 6 to 12 (more preferably 6 to 11). At a pH value less than 6, precipitation of the compound may not always occur. At a pH value exceeding 12, the precipitation reaction occurs excessively fast and the average particle size of the compound is increased. Regulating the pH value to be in a range of 6 to 12 will help the compound to uniformly attach to the surface of the conductive agent main body while suppressing the increase in average particle size of the compound.

After the precipitation step described above, the conductive agent is preferably heat-treated. The heat treatment temperature is preferably 80° C. or higher and 600° C. or lower. At a heat treatment temperature less than 80° C., the conductive agent may contain water. At a heat treatment temperature exceeding 600° C., the surface of the conductive agent may become oxidized.

(3) Examples of the positive electrode active material used in combination with the conductive agent described above include lithium cobaltate and a Ni—Co—Mn lithium complex oxide described above, and nickel-containing lithium complex oxides such as a Ni—Al—Mn lithium complex oxide and a Ni—Co—Al lithium complex oxide. In particular, since the present invention exhibits an effect of improving the high temperature cycle characteristics for high-voltage charging, a layered compound containing Co or Ni suitable for high-voltage charging is preferred. These materials may be used alone or mixed with other positive electrode active materials.

(4) A negative electrode active material may be any material that can reversibly intercalate and deintercalate lithium. Examples thereof include graphite, coke, tin oxide, metallic lithium, silicon, and a mixture of any two or more of these.

(5) Examples of the lithium salt that serves as the electrolyte include $LiPF_6$, $LiBF_4$, $LiN(SO_2CF_3)_2$, $LiN(SO_2C_2F_5)_2$, and $LiPF_{6-x}(C_nF_{2n-1})_x$ (where $1<x<6$, $n=1$ or 2). One or a mixture of two or more of these may be used. The concentration of the supporting salt is not particularly limited but is preferably limited to 0.8 to 1.5 mol per liter of the electrolyte. The solvent species is preferably a carbonic acid ester solvent such as ethylene carbonate (EC), propylene carbonate (PC), gamma-butyrolactone (GBL), diethyl carbonate (DEC), ethyl methyl carbonate (EMC), or dimethyl carbonate (DMC), or a carbonate solvent of the foregoing with some of H atoms substituted with F atoms. More preferably, a combination of a cyclic carbonic acid ester and a linear carbonic acid ester is preferred.

EXAMPLES

The present invention will now be described in further detail based on Examples. The scope of the present invention is not limited by Examples described below and adequate modifications may be made without departing from the essence of the invention.

First Example

Example 1

Preparation of Positive Electrode

To 3 L of pure water, 30 g of acetylene black (average particle size of primary particles: about 50 nm, average particle diameter of secondary particles: about 200 nm) serving as a conductive agent main body was added, followed by stirring. To the resulting solution, an aqueous solution dissolving 2.16 g of erbium nitrate pentahydrate was added. To the solution containing the dispersed conductive agent, 10 mass % of nitric acid and 10 mass % of an aqueous sodium hydroxide solution were added to keep the pH of the dispersion solution to 9. The resulting aqueous solution was suction-filtered and washed with water to obtain powder. The powder was dried at 120° C. for 2 hours. As a result, a conductive agent main body having an erbium compound (average particle size: about 20 nm, mainly erbium hydroxide) attached to the surface thereof was obtained. Then a heat treatment at 300° C. was conducted in air for 5 hours to prepare a conductive agent (the erbium compound described above was mainly composed of erbium oxyhydroxide). The average particle size of the primary particles of acetylene black, the average particle size of the secondary particles of acetylene black, and the average particle size of the erbium compound were determined by SEM observation. All average particle sizes in the description of this application were measured through this SEM observation.

The ratio of the erbium compound to the acetylene black was confirmed to be 2.6 mass % in terms of erbium (the ratio of the erbium compound to the lithium cobaltate was 0.069 mass % in terms of erbium). The ratio of the conductive agent to the erbium oxyhydroxide was 2815 mass % in terms of erbium oxyhydroxide. These ratios were determined by using an ICP spectrometer (produced by Seiko Instruments Inc.).

The conductive agent, lithium cobaltate serving as a positive electrode active material, and polyvinylidene fluoride (PVdF) serving as a binder were weighed so that the mass ratio of the three was 2.5:95:2.5, and kneaded in an N-methyl-2-pyrrolidone (NMP) solution to prepare a positive electrode slurry. Lastly, the positive electrode slurry was applied to both surfaces of an aluminum foil serving as a positive electrode current collector, dried, and subjected to rolling so that the packing density was 3.7 g/cc to obtain a positive electrode.

[Preparation of Negative Electrode]

Graphite serving as a negative electrode active material, styrene butadiene rubber (SBR) serving as a binder, and carboxymethyl cellulose (CMC) serving as a thickener were weighed so that the mass ratio of the three was 98:1:1, and kneaded in an aqueous solution to prepare a negative electrode slurry. The negative electrode slurry was applied to both surfaces of a copper foil serving as a negative electrode current collector, dried, and subjected to rolling so that the packing density was 1.6 g/cc to obtain a negative electrode.

[Preparation of Nonaqueous Electrolyte]

To a 3:7 (V/V) mixed solvent of ethylene carbonate (EC) and diethyl carbonate (DEC), lithium hexafluorophosphate ($LiPF_6$) was dissolved at a ratio of 1.0 mol/L and vinylene carbonate (VC) was added thereto so that the ratio of the vinylene carbonate to the solvent was 0.8 mass %.

[Preparation of Battery]

After lead terminals were attached to the positive and negative electrodes, the positive and negative electrodes were wound with a separator therebetween and pressed into a flat shape to prepare a flat electrode assembly. Then the electrode assembly was inserted into a battery case constituted by an aluminum laminate, the nonaqueous electrolyte was poured into the battery case, and the opening of the battery case was sealed to prepare a battery. The design capacity of the battery was 750 mAh.

Figure 2:
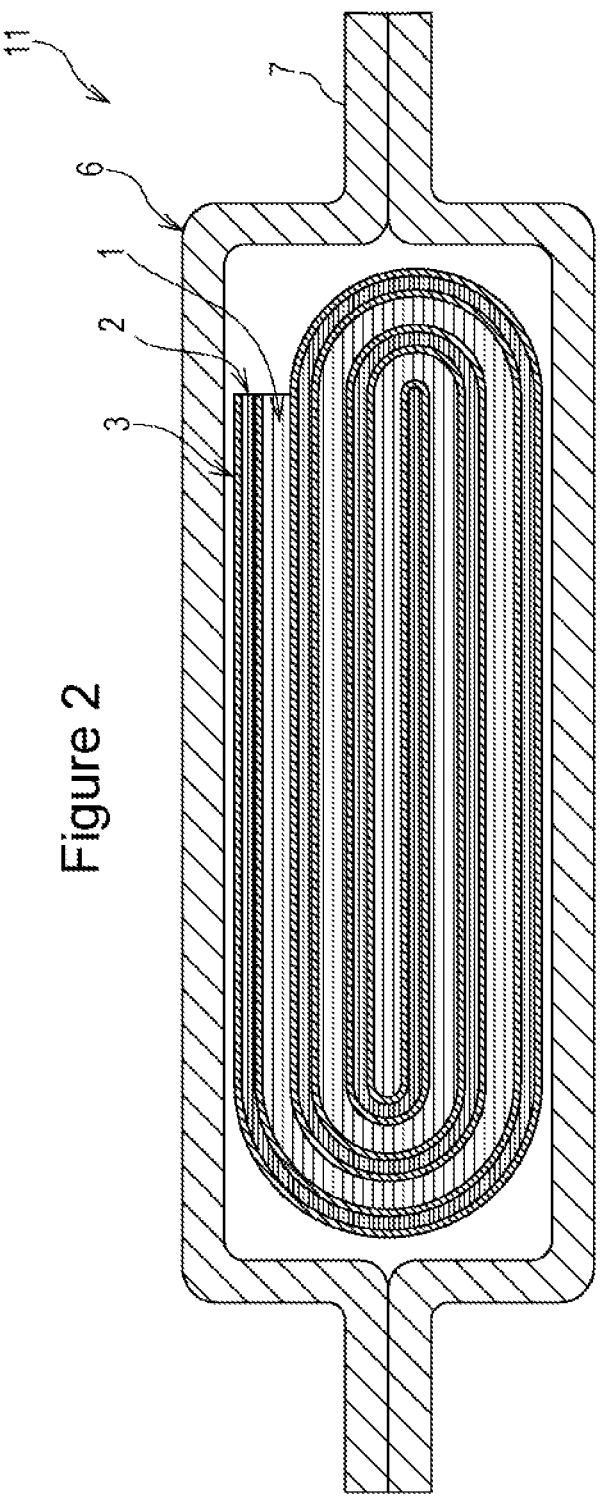
FIG. 2 is a cross-sectional view taken along line A-A in FIG. 1.

A specific structure of a nonaqueous electrolyte secondary battery 11 is shown in FIGS. 1 and 2. A positive electrode 1 and a negative electrode 2 are arranged to face each other with a separator 3 therebetween. A flat electrode assembly constituted by the positive and negative electrodes 1 and 2 and the separator 3 is impregnated with a nonaqueous electrolyte. The positive electrode 1 and the negative electrode 2 are respectively connected to a positive electrode current collecting tab 4 and a negative electrode current collecting tab 5 so that charging and discharging as the secondary battery is possible. The electrode assembly is disposed in an storage space of an aluminum laminate case 6 having a closing portion 7 formed by heat-sealing peripheral edges.

The battery prepared as such is referred to as a battery A1 hereinafter.

Example 2

A battery was prepared as in Example 1 except that the compound to be attached to the surface of the conductive agent main body was changed from an erbium-containing compound to an aluminum-containing compound (average particle size: about 20 nm, mainly composed of aluminum hydroxide or aluminum oxide). The amount of the aluminum-containing compound added in terms of aluminum was adjusted to be equimolar to the erbium element.

The battery prepared as such is referred to as a battery A2 hereinafter.

Example 3

A battery was prepared as in Example 1 except that the compound to be attached to the surface of the conductive agent main body was changed from the erbium-containing compound to a zirconium-containing compound (average particle size: about 20 nm, mainly composed of zirconium hydroxide) and that the heat treatment temperature was changed to 120° C. The amount of the zirconium-containing compound added in terms of zirconium was adjusted to be equimolar to the erbium element.

The battery prepared as such is referred to as a battery A3 hereinafter.

Example 4

A battery was prepared as in Example 1 except that the compound to be attached to the surface of the conductive agent main body was changed from the erbium-containing compound to a lanthanum-containing compound (average particle size: about 20 nm, mainly composed of lanthanum hydroxide or lanthanum oxyhydroxide). The amount of the lanthanum-containing compound added in terms of lanthanum was adjusted to be equimolar to the erbium element.

The battery prepared as such is referred to as a battery A4 hereinafter.

Comparative Example 1

A battery was prepared as in Example 1 except that nothing was attached to the surface of the conductive agent main body (in other words, the conductive agent main body serves as a conductive agent in this case).

The battery prepared as such is referred to as a battery Z1 hereinafter.

Comparative Example 2

A battery was prepared as in Example 1 except that nothing was attached to the surface of the conductive agent main body (in other words, the conductive agent main body serves as a conductive agent in this case) and that erbium oxyhydroxide was mixed with the conductive agent and then the resulting mixture and the positive electrode active material were kneaded. Whereas the average particle size of erbium oxyhydroxide was 500 nm, the average particle size of the conductive agent was 50 nm. Thus, in Comparative Example 2, the surface of erbium oxyhydroxide was presumed to be coated with the conductive agent.

The battery prepared as such is referred to as a battery Z2 hereinafter.

Experiment

The batteries A1 to A3, Z1, and Z2 were charged and discharged under the following experimental conditions to evaluate the initial charge-discharge property and the high temperature cycle characteristic (capacity retention rate). The results are shown in Table 1.

[Experimental Conditions for Evaluating Initial Charge-Discharge Property]

Charge Conditions

A constant-current charging was conducted at a current of 1.0 It (750 mA) up to 4.4 V and then charging at a constant voltage of 4.4 V was conducted up to It/20 (37.5 mA). The capacity observed during this charging was measured to determine the initial charge capacity Qc1.

Discharge Conditions

Constant-current discharging was conducted at a current of 1.0 It (750 mA) until 2.75 V. The capacity observed in this discharging was measured to determine the initial discharge capacity Qd1.

Interval

The interval between the charging and the discharging was 10 minutes.

Temperature

25° C.

The initial charge-discharge efficiency was determined through formula (1) below from Qc1 and Qd1:

Initial charge-discharge efficiency (%)=(initial discharge capacity $Qd1$/initial charge capacity $Qc1$)×100 (1)

[Experimental Conditions for Evaluation High-Temperature Cycle Characteristic]

The charge-discharge cycle was repeated under the same conditions as the experimental conditions for evaluating the initial charge-discharge property described above except that the charge-discharge was conducted in an environment at a temperature of 45° C. During charging and discharging at 45° C., the discharge capacity $Q_1$ of the first cycle and the discharge capacity $Q_{250}$ of the 250th cycle were investigated. The capacity retention rate was determined through formula (2) from these discharge capacities, and the high-temperature cycle characteristic was evaluated based on the capacity retention rate:

Capacity retention rate (%)=(discharge capacity $Q_{250}$/discharge capacity $Q_1$)×100 (2)

TABLE 1

| Type of battery | Compound element attached to surface of conductive agent main body | Initial charge-discharge efficiency (%) | Capacity retention rate (%) |
|---|---|---|---|
| Battery A1 | Er | 90.9 | 75.3 |
| Battery A2 | Al | 90.8 | 67.0 |
| Battery A3 | Zr | 90.8 | 64.4 |
| Battery A4 | La | 90.5 | 70.3 |
| Battery Z1 | — | 90.7 | 41.8 |
| Battery Z2 | — (mixed with conductive agent) | 90.7 | 31.2 |

As shown in Table 1, the battery Z1 that uses a conductive agent having a surface to which nothing is attached and the battery Z2 that uses a positive electrode prepared by mixing erbium oxyhydroxide with a conductive agent having a surface to which nothing is attached exhibited an initial charge-discharge efficiency to 90% or higher, which is an acceptable level. However, the capacity retention rates of these batteries Z1 and Z2 after repeating charge-discharge cycles at high temperature are 41.4% and 31.2%, respectively, which are significantly low. In contrast, the batteries A1 to A4 that each use a conductive agent in which a compound containing erbium, aluminum, zirconium, or lanthanum is attached to the surface of the conductive agent main body exhibited an initial charge-discharge efficiency of 90% or more and a capacity retention rate of 64.4% or more after repeating the charge-discharge cycle at high temperature. Compared to batteries Z1 and Z2, the batteries A1 and A4 have dramatically improved characteristics.

These results are presumably due to the following reasons. That is, in the batteries A1 to A4, the oxidative decomposition of the electrolyte can be suppressed during the charge-discharge cycle at high temperature and high voltage and thus the conductive agent and the positive electrode active material are suppressed from being coated with decomposition products of such a reaction. Accordingly, the decrease in electrical conductivity in the positive electrode that occurs by repeating charging and discharging can be suppressed. Moreover, since the particle size of the compound containing erbium or the like is smaller than the particle size of the conductive agent main body, the conductive agent is present between the particles of the positive electrode active material while avoiding the state in which the particles of the conductive agent are not in contact with each other. Thus, a conducive network formed by the conductive agent can be sufficiently formed in the positive electrode. Thus, in the batteries A1 to A4, inhibition of the charge-discharge reaction can be suppressed despite repeating the charge-discharge cycle at high temperature and high voltage.

In contrast, the battery Z1 uses a conductive agent having a surface to which nothing is attached. Thus, the oxidative decomposition reaction of the electrolyte cannot be suppressed during the charge-discharge cycle at high temperature and high voltage. Accordingly, the conductive agent and the positive electrode active material are coated with decomposition products of the reaction and the conductivity is degraded in the positive electrode as charging and discharging are repeated. The capacity retention rate showed a larger decrease in the battery Z2 than in the battery Z1 presumably due to the following reason. First, erbium oxyhydroxide is larger than the conductive agent and thus the conductive agent main body is attached to the surface of the erbium oxyhydroxide. Thus, the area of the exposed conductive agent cannot be sufficiently decreased and the oxidative decomposition reaction of the electrolyte cannot be sufficiently suppressed. Moreover, when erbium oxyhydroxide is larger than the conductive agent, the conductive agent does not exist between the particles of the positive electrode active material and thus a state in which only erbium oxyhydroxide not having conductivity is present between the particles of the positive electrode active material and a state in which the particles of the conductive agent are not in contact with each other are created. Accordingly, the conductive network formed by the conductive agent is blocked in the positive electrode and, as a result, the resistance in the positive electrode is increased.

Second Example

Example 1

A battery was prepared as in Example 1 of First Example except that the amount of erbium nitrate pentahydrate was changed from 2.16 g to 5.53 g so that the amount of the erbium-containing compound to be attached to the surface of the conductive agent main body in terms of erbium was changed from 2.6 mass % to 6.9 mass %.

The battery prepared as such is referred to as a battery B1 hereinafter.

Example 2

A battery was prepared as in Example 1 of First Example except that the amount of erbium nitrate pentahydrate was changed from 2.16 g to 11.9 g so that the amount of the erbium-containing compound to be attached to the surface of the conductive agent main body in terms of erbium was changed from 2.6 mass % to 14.9 mass %.

The battery prepared as such is referred to as a battery B2 hereinafter.

Experiment

The initial charge-discharge property and the high-temperature cycle characteristic (capacity retention rate) of the batteries B1 an B2 were evaluated. The results are shown in Table 2. The experimental conditions and the like were the same as those in the experiment of First Example. Table 2 also includes the results obtained from the batteries A1 and Z1.

TABLE 2

| Type of battery | Ratio of the erbium-containing compound to conductive agent main body in terms of erbium (mass %) | Initial charge-discharge efficiency (%) | Capacity retention rate (%) |
|---|---|---|---|
| Battery A1 | 2.6 | 90.9 | 75.3 |
| Battery B1 | 6.9 | 90.9 | 73.0 |
| Battery B2 | 14.9 | 90.9 | 72.6 |
| Battery Z1 | — | 90.7 | 41.8 |

Table 2 confirms that the effect of suppressing the decrease in capacity after charge-discharge cycles is exhibited without decreasing the initial efficiency if the ratio of the erbium-containing compound to the conductive agent main body is 2.6 mass % or more and 14.9 mass % or less.

Third Example

Example

A battery was prepared as in Example 1 of First Example except that an erbium-containing compound is attached also to the surface of lithium cobaltate serving as a positive electrode active material by the process described below. The ratio of the erbium-containing compound to the positive electrode active material was 0.09 mass % in terms of erbium.

A process (process of attaching an erbium-containing compound to a conductive agent) substantially the same as that described in Example 1 of First Example was used to attach an erbium-containing compound to the surface of lithium cobaltate. In particular, the same process of attaching the erbium-containing compound to the conductive agent was performed except that a solution of 0.91 g of erbium nitrate pentahydrate was mixed with a solution prepared by dispersing 500 g of lithium cobaltate in 1.5 L of water. As a result, a positive electrode active material in which an erbium-containing compound (mainly composed of erbium oxyhydroxide) was attached to the surface of lithium cobaltate was obtained.

The battery prepared as such is referred to as a battery C hereinafter.

Experiment

The initial charge-discharge property and the high-temperature cycle characteristic (capacity retention rate) of the battery C were evaluated. The results are shown in Table 3. The experimental conditions and the like were the same as those in the experiment of First Example. Table 3 also includes the results obtained from the batteries A1 and Z1.

TABLE 3

| Type of battery | Ratio in terms of erbium (mass %) | | Initial charge-discharge efficiency (%) | Capacity retention rate (%) |
| --- | --- | --- | --- | --- |
| | Conductive agent | Positive electrode active material | | |
| Battery A1 | 2.6 | — | 90.9 | 76.6 |
| Battery C | 2.6 | 0.09 | 90.9 | 83.8 |
| Battery Z1 | — | — | 90.7 | 41.8 |

Table 3 confirms that compared to the battery A1 in which the erbium-containing compound is attached only to the conductive agent main body, the battery C in which the erbium-containing compound is attached to both the conductive agent main body and the positive electrode active material exhibits an improved capacity retention rate while the initial charge-discharge efficiency is the same.

This is presumably due to the fact that the battery C in which the erbium-containing compound is attached to both the conductive agent main body and the positive electrode active material can suppress side reactions such as oxidation decomposition of the electrolyte at the surface of the positive electrode active material.

Fourth Example

Example

A battery was prepared as in Example 1 of First Example except that a Ni—Co—Mn lithium complex oxide where Ni:Co:Mn was 7:2:1 was used as a positive electrode active material instead of lithium cobaltate.

The battery prepared as such is referred to as a battery D hereinafter.

Comparative Example

A battery was prepared as in Comparative Example 1 of First Example except that a Ni—Co—Mn lithium complex oxide where Ni:Co:Mn was 7:2:1 was used as a positive electrode active material instead of lithium cobaltate.

The battery prepared as such is referred to as a battery Y hereinafter.

Experiment

The initial charge-discharge property and the capacity retention rate of the batteries D and Y were investigated. The results are shown in Table 4. The experimental conditions and the like were the same as in the experiment of First Example except that the end-of-charge voltage was changed to 4.25 V and the end-of-discharge voltage was changed to 3.0 V.

TABLE 4

| Type of battery | Conductive agent | Initial charge-discharge efficiency (%) | Capacity retention rate (%) |
| --- | --- | --- | --- |
| Battery D | Treated | 77.0 | 76.5 |
| Battery Y | Untreated | 76.9 | 63.1 |

As shown in Table 4, the battery Y that uses a conductive agent having a surface to which nothing is attached exhibits a capacity retention rate of 63.1% after repeating the cycle at high temperature and high voltage. In contrast, the battery D that uses a conductive agent having a surface to which the erbium-containing compound is attached exhibits a capacity retention rate of 76.5%, which is a significant improvement from the battery Y. These results are presumably due to the following reason. That is, in the battery D that uses a conductive agent having a surface to which the erbium compound is attached, the oxidative decomposition of the electrolyte can be suppressed during the charge-discharge cycles at high temperature and high voltage and thus the conductive agent and the positive electrode active material can be suppressed from being coated with decomposition products of the reaction. In contrast, in the battery Y that uses a conductive agent having a surface to which the erbium compound is not attached, the oxidative decomposition of the electrolyte cannot be suppressed during the charge-discharge cycles at high temperature and high voltage and thus the conductive agent and the positive electrode active material are not suppressed from being coated with the decomposition products of the reaction.

No difference was observed in the initial charge-discharge efficiency between the battery D and the battery Y.

Fifth Example

Example

A battery was prepared as in Example 1 of First Example except that a Ni—Co—Mn lithium complex oxide where Ni:Co:Mn was 5:2:3 was used as a positive electrode active material instead of lithium cobaltate.

The battery prepared as such is referred to as a battery E hereinafter.

Comparative Example

A battery was prepared as in Comparative Example 1 of First Example except that a Ni—Co—Mn lithium complex oxide where Ni:Co:Mn was 5:2:3 was used as a positive electrode active material instead of lithium cobaltate.

The battery prepared as such is referred to as a battery X hereinafter.

Experiment

The initial charge-discharge property and the capacity retention rate of the batteries E and X were investigated. The results are shown in Table 5. The experimental conditions and the like were the same as in the experiment of First Example except that the end-of-charge voltage was changed to 4.4 V, the end-of-discharge voltage was changed to 3.0 V, and the capacity retention rate was calculated from the discharge capacity at the 80th cycle.

TABLE 5

| Type of battery | Conductive agent | Initial charge-discharge efficiency (%) | Capacity retention rate (80 cycles) (%) |
| --- | --- | --- | --- |
| Battery E | Treated | 79.2 | 48.1 |
| Battery X | Untreated | 79.2 | 15.8 |

As shown in Table 5, the battery X that uses a conductive agent having a surface to which nothing is attached exhibits a capacity retention rate of 15.8% after repeating the cycle at high temperature and high voltage. In contrast, the battery E that uses a conductive agent having a surface to which an erbium-containing compound is attached exhibits a capacity retention rate of 48.1%, which is a significant improvement from the battery X. These results are presumably due to the same reason as that described in Fourth Example.

No difference was observed in the initial charge-discharge efficiency between the battery E and the battery X.

(Matters that Became Clear from the Results of Fourth Example and Fifth Example)

The capacity retention rate in the high-temperature high-voltage cycle can be improved without decreasing the initial charge-discharge efficiency by attaching an erbium-containing compound to the surface of the conductive agent main body not only in the cases where lithium cobaltate was used as the positive electrode active material as in First Example but also in the cases where a Ni—Co—Mn lithium complex oxide was used as the positive electrode active material as in Fourth Example. This shows that the effect brought about by attaching an erbium-containing compound to the surface of the conductive agent main body is exhibited for a variety of types of positive electrode active materials.

INDUSTRIAL APPLICABILITY

The present invention can be expected to be applied to driving power sources for portable information terminals such as cellular phones, laptop computers, and PDAs and high-output driving pour sources for HEVs and power tools.

REFERENCE SIGNS LIST

1 positive electrode
2 negative electrode
3 separator
6 aluminum laminate case

The invention claimed is:

1. A conductive agent for a nonaqueous electrolyte secondary battery, comprising a conductive agent main body composed of carbon and a compound attached to a surface of the conductive agent main body, wherein the average particle size of primary particles or secondary particles of the conductive agent main body is larger than the average particle size of the compound and the compound contains at least one metal element selected from the group consisting of aluminum, zirconium, magnesium, and a rare earth element, wherein the compound has an average particle size of 20 nm or more and 100 nm or less.

2. The conductive agent for a nonaqueous electrolyte secondary battery according to claim 1, wherein the compound contains at least one selected from the group consisting of a hydroxide of the metal element, an oxyhydroxide of the metal element, a carbonate compound of the metal element, and an oxide of the metal element.

3. The conductive agent for a nonaqueous electrolyte secondary battery according to claim 2, wherein the compound is at least one compound selected from the group consisting of a hydroxide of the rare earth element, an oxyhydroxide of the rare earth element, a carbonate compound of the rare earth element, and an oxide of the rare earth element.

4. The conductive agent for a nonaqueous electrolyte secondary battery according to claim 3, wherein the compound is a hydroxide of the rare earth element or an oxyhydroxide of the rare earth element.

5. The conductive agent for a nonaqueous electrolyte secondary battery according to claim 1, wherein the ratio of the compound to the conductive agent main body is 14.9 mass % or less in terms of the metal element in the compound.

6. A positive electrode for a nonaqueous electrolyte secondary battery, comprising the conductive agent for a nonaqueous electrolyte secondary battery according to claim 1 and a positive electrode active material.

7. A positive electrode for a nonaqueous electrolyte secondary battery, wherein a conductive agent is present on a surface of a positive electrode active material, the conductive agent includes a conductive agent main body composed of carbon and a compound attached to a surface of the conductive agent main body, the average particle size of primary particles or secondary particles of the conductive agent main body is larger than the average particle size of the compound, and the compound contains at least one metal element selected from the group consisting of aluminum, zirconium, magnesium, and a rare earth element, wherein the compound has an average particle size of 20 nm or more and 100 nm or less.

8. The nonaqueous electrolyte positive electrode according to claim 7, wherein the compound attached to the surface of the conductive agent main body contains a rare earth element.

9. The positive electrode for a nonaqueous electrolyte secondary battery according claim 7, wherein a compound that contains at least one metal element selected from the group consisting of aluminum, zirconium, magnesium, and a rare earth element is attached to a surface of the positive electrode active material.

10. The nonaqueous electrolyte positive electrode according to claim 9, wherein the compound attached to the surface of the positive electrode active material contains a rare earth element.

11. The positive electrode for a nonaqueous electrolyte secondary battery according to claim 7, wherein the positive electrode active material contains at least one element selected from the group consisting of nickel, cobalt, and manganese.

12. The positive electrode for a nonaqueous electrolyte secondary battery according to claim 11, wherein the positive electrode active material is lithium cobaltate.

13. The positive electrode for a nonaqueous electrolyte secondary battery according to claim 11, wherein the positive electrode active material is a lithium complex oxide containing nickel, cobalt, and manganese.

14. A nonaqueous electrolyte secondary battery comprising the positive electrode for a nonaqueous electrolyte secondary battery according claim 7.

15. A positive electrode for a nonaqueous electrolyte secondary battery, wherein a conductive agent is present on a surface of a positive electrode active material, the conductive agent includes a conductive agent main body composed of carbon and a compound attached to a surface of the conductive agent main body, the average particle size of primary particles or secondary particles of the conductive agent main body is larger than the average particle size of the compound, and the compound contains at least one metal element selected from the group consisting of aluminum, zirconium, magnesium, and a rare earth element, wherein the compound contains at least one selected from the group consisting of a hydroxide of the metal element, an oxyhydroxide of the metal element, and a carbonate compound of the metal element.

16. A positive electrode for a nonaqueous electrolyte secondary battery according to claim 15, wherein the compound is at least one selected from the group consisting of a hydroxide of rare earth element, an oxyhydroxide of rare earth element, and a carbonate compound of rare earth element.

17. A positive electrode for a nonaqueous electrolyte secondary battery according to claim 16, wherein the compound is a hydroxide of rare earth element or an oxyhydroxide of rare earth element.

18. A positive electrode for a nonaqueous electrolyte secondary battery according to claim 17, wherein the compound is an oxyhydroxide of rare earth element.

\* \* \* \* \*